United States Patent [19]

Itaya

[11] Patent Number: 4,669,289

[45] Date of Patent: Jun. 2, 1987

[54] COIL SPRING MANUFACTURING APPARATUS

[75] Inventor: Reijiro Itaya, Tokyo, Japan

[73] Assignee: Kabushiki Kaisha Itaya, Tokyo, Japan

[21] Appl. No.: 935,618

[22] Filed: Dec. 2, 1986

Related U.S. Application Data

[63] Continuation of Ser. No. 772,725, Sep. 4, 1985, abandoned.

[30] Foreign Application Priority Data

Dec. 11, 1984 [JP] Japan .................................. 59-259939

[51] Int. Cl.[4] .............................................. B21F 3/04
[52] U.S. Cl. .......................................... 72/23; 72/138; 72/142
[58] Field of Search ................... 72/23, 135, 137, 138, 72/142, 143

[56] References Cited

U.S. PATENT DOCUMENTS

| 4,018,070 | 4/1977 | Yagusic et al. | 72/142 X |
| 4,018,071 | 4/1977 | Lampietti | 72/142 X |
| 4,030,327 | 6/1977 | Collins et al. | 72/23 |
| 4,289,004 | 9/1981 | Itaya | 72/138 X |
| 4,362,038 | 12/1982 | Katahira et al. | 72/137 X |
| 4,503,694 | 3/1985 | Takumi | 72/137 X |

OTHER PUBLICATIONS

Western Electric Technical Digest No. 45, Jan. 1977, pp. 1 and 2.

Primary Examiner—E. Michael Combs
Attorney, Agent, or Firm—Frishauf, Holtz, Goodman & Woodward

[57] ABSTRACT

A coil spring manufacturing apparatus adapted to establish agreement between an amount of wire feed and an amount of the wire wound into a coil on a winding tool includes a winding tool rotated while being moved axially for winding the wire therearound, a winding motor for rotating the winding tool, a feed roller rotating motor for feeding the wire to the winding tool, and a control unit for reading in control information to subject the winding motor and the feed roller rotating motor to equivalent degrees of control. The apparatus is operated in accordance a program composed of control instructions.

7 Claims, 10 Drawing Figures

| STEP NO. | INSTRUCTION | |
|---|---|---|
| 1 | A | 14 |
| 2 | L | 0,05 |
| 3 | F | 31,92 |
| 4 | A | 10 |
| 5 | L | 0,10 |
| 6 | A - | 10 |
| 7 | L | 0,05 |
| 8 | O | 0,210 |
| 9 | P | 0,20 |
| 10 | F | 8,70 |
| 11 | L | 0,05 |
| 12 | A | 7 |
| ⋮ | ⋮ | |
| n | E | |

COIL SPRING MANUFACTURING APPARATUS

This application is a continuation of application Ser. No. 772,725, filed Sept. 4, 1985, abandoned.

BACKGROUND OF THE INVENTION

1. Field of the Invention

This invention relates to a coil spring manufacturing apparatus for manufacturing coil springs by winding a wire on a mandrel.

2. Description of the Prior Art

Figure 4:
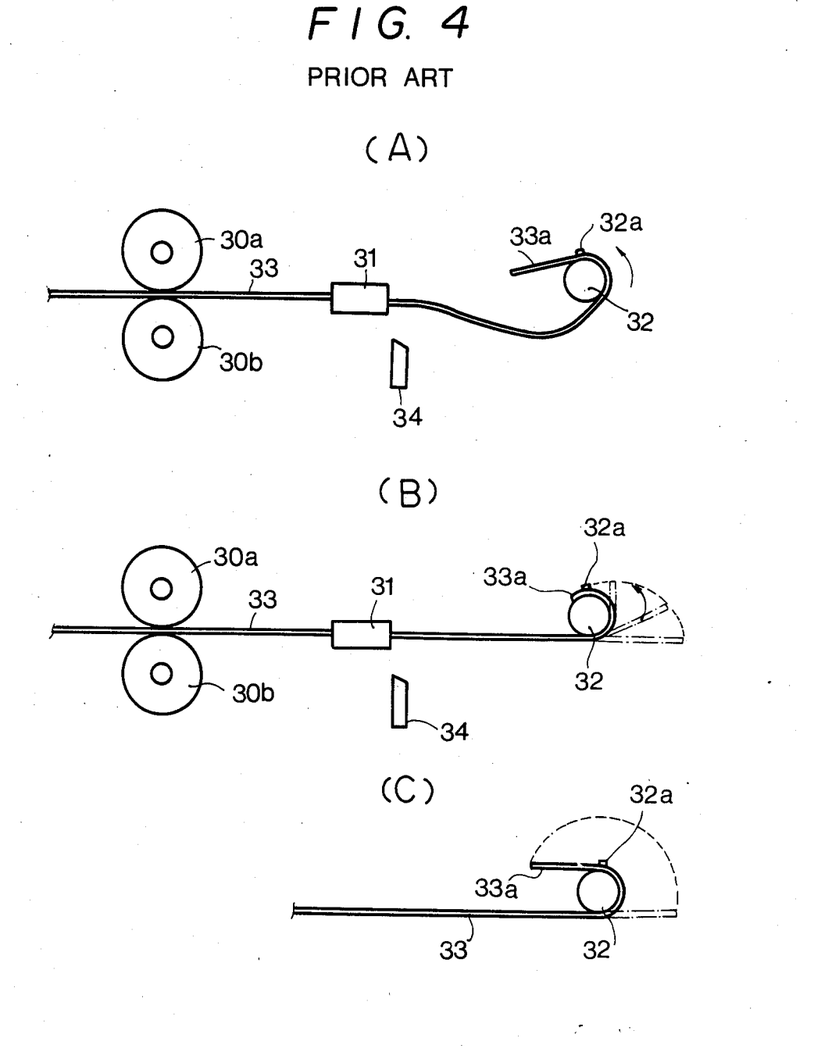
FIGS. 4(A) through (C) are schematic views useful in describing a wire winding operation performed by a coil wire manufacturing apparatus according to the prior art.

As shown in FIGS. 4(A), (B), a conventional apparatus for manufacturing coil springs includes a pair of feed rollers 30a, 30b arranged to feed a wire 33 through a guide 31 in such a manner that the distal end of the wire 33 is engaged by a projection 32a on a winding tool 32 comprising a mandrel. The winding tool 32 is rotated while being moved along its axis, whereby the wire is wound upon the tool and thus formed into a coil spring. A cutter 34 is actuated at the completion of coil spring formation to sever the wire 33.

In the above-described conventional apparatus, the feed rollers 30a, 30b and the winding tool 32 are driven rotatively by a single motor acting through a mechanism consisting of such components as gears and clutches. Owing to such a structural arrangement, it is extremely difficult to establish good agreement between the amount of wire fed by the feed rollers 30a, 30b and the amount of wire wound up by the winding tool 32. It has been attempted to solve this problem by disengaging the feed rollers 30a, 30b from a drive shaft when the wire 33 is taken up by the winding tool 32, thus subjecting the wire 33 to a prescribed tension derived from the inertia possessed by the feed rollers proper. However, such an expedient is attended by a number of difficulties. For example, depending upon such factors as the winding rate of the winding tool 32, the material constituting the wire 33 and the rigidity of the wire, a difference in the amount of wire bulge develops, as shown in FIG. 4(A), even though winding of the wire is intended to be wound around the winding tool 32, as shown in FIG. 4(C). As a result, even though the wire 33 is wound upon the tool 32, which will take place providing there is no slip, an error in the winding angle is produced. This makes it impossible to manufacture coil springs of identical quality. In addition, though the wire 32 will be taken up by the mandrel or winding tool 32 in a reliable manner if the feed rollers 30a, 30b tension the wire 33 weakly, too much tension does not enable positive take up, thus resulting in a shortened leg 33a, as shown in FIG. 4(B). Coil springs manufactured by such an arrangement therefore do not have legs 33a of identical length. Furthermore, since the wire 33 is drawn out owing to the tension between the wire and the projection 32a of the winding tool 32, the projection 32a is subjected to a load and presents a degree of friction that can have a detrimental effect upon product stability. Also, a slight amount of play which develops between the wire 33 and the projection 32a diminishes the length of the coil spring leg 33a correspondingly.

SUMMARY OF THE INVENTION

An object of the present invention is to provide a coil spring manufacturing apparatus capable of establishing precise agreement between the amount of wire wound upon the winding tool and the amount of wire fed by the feed rollers, thereby enabling the manufacture of highly precise coil springs having a winding angle and leg length of prescribed, constant values.

Another object of the present invention is to provide a coil spring manufacturing apparatus capable of altering spring pitch at will.

Still another object of the present invention is to provide a coil spring manufacturing apparatus capable of manufacturing a highly precise coil spring of any shape, regardless of the diameter of the wire used, by making it possible to freely set the amount of rotation and the operating sequence of various motors.

A further object of the present invention is to provide a coil spring manufacturing apparatus in which the rotating speeds of a winding motor and feed rollers can be set independently in accordance with, e.g., the kind of material constituting the wire.

A yet further object of the present invention is to provide a coil spring manufacturing apparatus capable of automatically calculating and controlling the amount of wire supplied, this being performed on the basis of information indicative of spring central diameter, the amount of up-and-down movement and the amount of rotation of winding means.

Another object of the present invention is to provide a coil spring manufacturing apparatus which facilitates the manufacture of springs of identical shape by being provided with external memory means for storing a program which controls motors and peripheral equipment.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figures 1, 2:
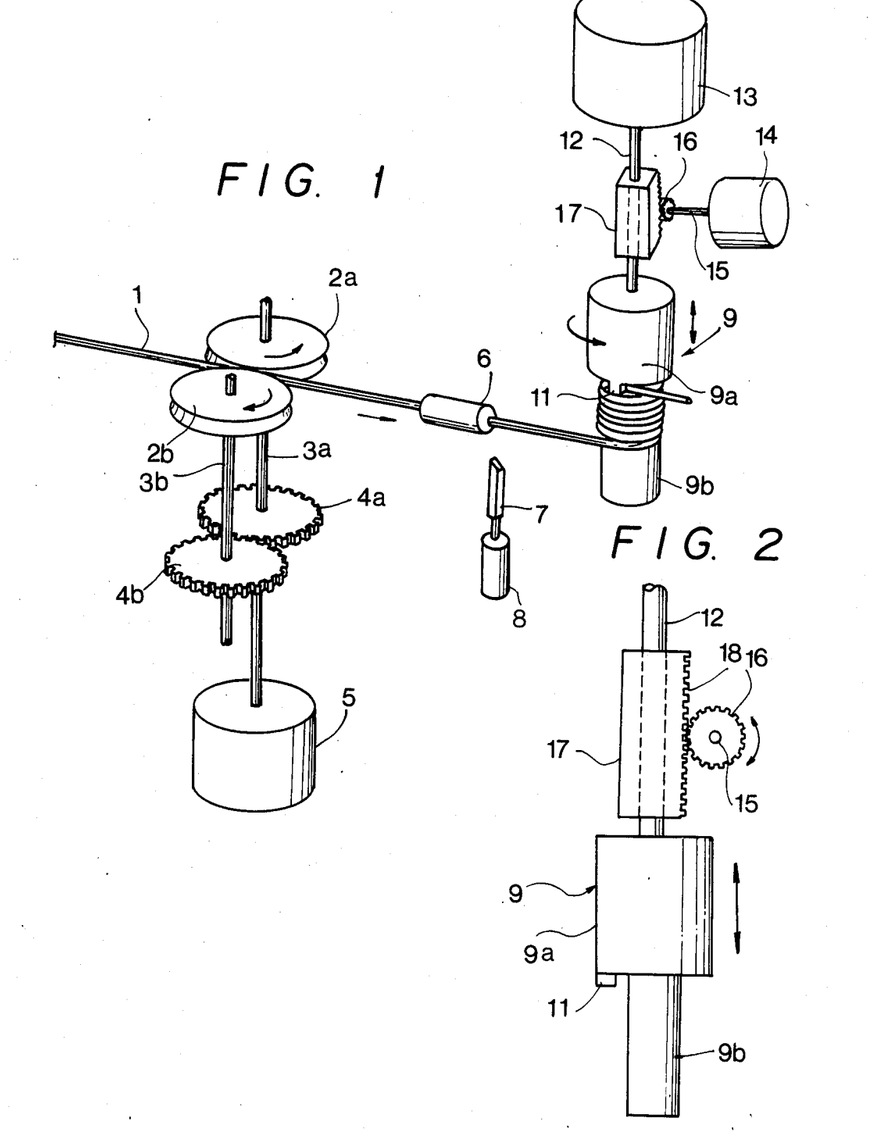
FIG. 1 is a perspective view showing a principal portion of a coil spring manufacturing apparatus embodying the present invention.
FIG. 2 is an enlarged side view illustrating a portion of the coil spring manufacturing apparatus of the present invention.

FIG. 1 is a perspective view illustrating a principal portion of a coil spring manufacturing apparatus embodying the present invention. A wire 1 for forming a coil spring is fed under a prescribed force by a pair of opposing feed rollers 2a, 2b which embrace the wire 1 between them as they are rotated in opposite directions.

The feed rollers 2a, 2b are secured to respective rotary shafts 3a, 3b provided with respective meshing gears 4a, 4b. The rotary shaft 3a is connected to a feed motor 5 comprising a servomotor. Rotating the feed motor 5 causes the feed roller 2a to rotate in the direction of the arrow. At the same time, the rotational motion of feed motor 5 is transmitted to the feed roller 2b via the meshing gears 4a, 4b, whereby feed roller 2b is rotated in the direction of the arrow at the same speed as the feed roller 2a. The feed rollers 2a, 2b thus feed the wire 1 in the direction of the arrow.

The wire 1 fed by the feed rollers 2a, 2b is guided in a given direction by a guide 6. A cutter 7 is provided in the proximity of the guide 6 for severing the wire 1 after the wire is formed into a coil spring. To sever the wire 1, the cutter 7 is advanced and retracted by a pneumatic or hydraulic cylinder 8.

A winding tool 9 is provided for winding the wire 1 onto its outer surface to form the wire 1 fed through the guide 6 into a coil spring. As shown in FIG. 2, the winding tool 9 comprises an upper cylindrical portion 9a and a contiguous lower cylindrical portion of smaller diameter constituting a mandrel 9b on which the spring is actually formed. The upper portion 9a of the winding tool 9 is formed to include a projection 11 on its lower face. The projection 11 is adapted to bite into and snag the distal end of the wire 1 so that the wire may be wound into a coil by the mandrel 9b. The winding tool 9 is coupled to a winding shaft motor 13, which comprises a servomotor, via a rotary shaft 12. The latter thus transmits the rotational motion of the motor 13 to the winding tool 9.

A servomotor 14 for motion axially of the shaft 12 includes a rotary shaft 15 provided with a pinion gear 16. As shown in FIG. 2, the pinion gear 16 is in meshing engagement with a rack 18 formed on the side face of a frame 17. The latter rotatably supports the rotary shaft 12 of the winding tool 9, thereby supporting the winding tool 9 and the winding shaft motor 13. Rotating the motor 14 for axial motion causes the pinion 16 to be rotated by the rotary shaft 15. The rotational motion of pinion 16 is transmitted to the rack 18 on frame 17, whereby the frame 17, winding tool 9 and winding shaft 13 are moved axially in unison in the direction of the arrows.

In the operation of the apparatus having the above-described construction, the wire 1 is fed by the feed rollers 2a, 2b after the distal end of the wire 1 has been snagged by the projection 11 on winding tool 9. During feed, the wire 1 is formed into a coil spring by being wound upon the mandrel 9b of winding tool 9, which is rotated by the winding shaft motor 13 while being raised by motor 14. After the wire is formed into a coil spring by the mandrel 9b, the latter is rotated a predetermined amount in the reverse direction to prevent the spring form uncoiling. This is followed by severing the wire 1 with the cutter 7.

Figure 3:
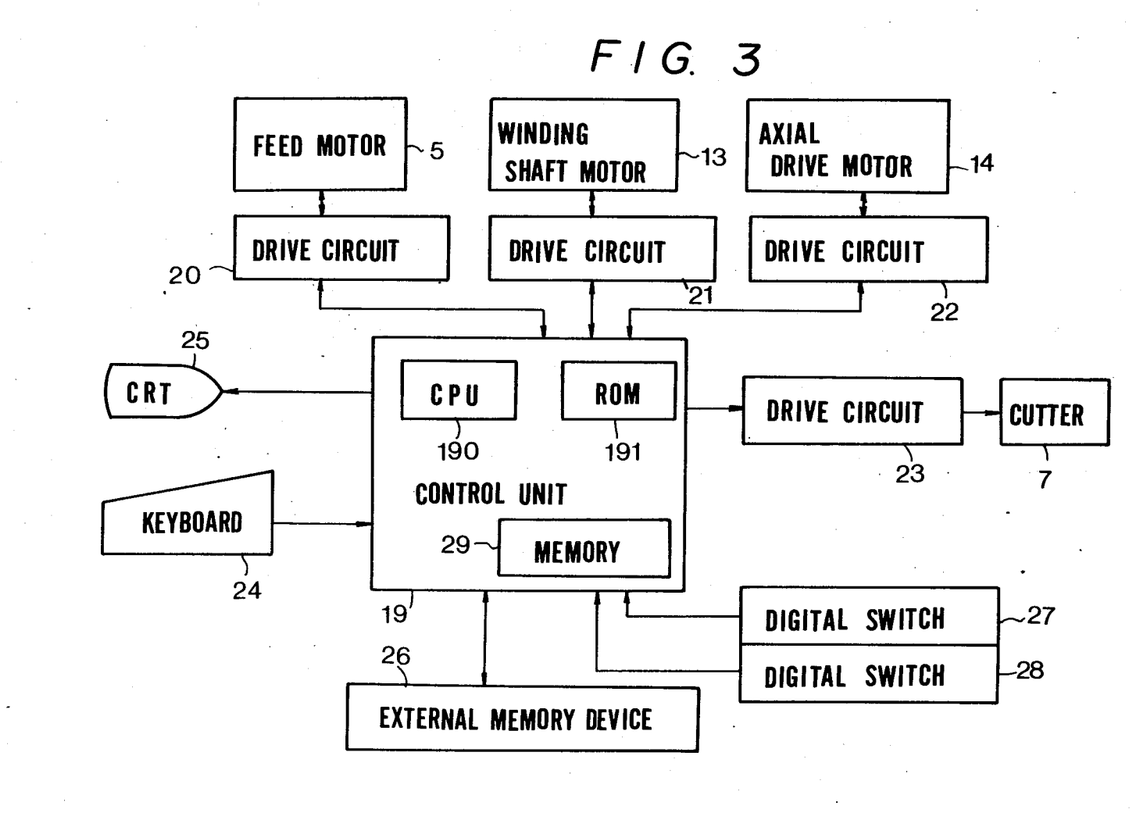
FIG. 3 is a block diagram illustrating an electronic system for controlling the coil spring manufacturing apparatus of the present invention.

Let us now refer to the block diagram of FIG. 3 to describe a system for controlling the coil spring manufacturing apparatus of the present invention.

The system includes a control unit 19 for controlling the motors 5, 13 and 14 and the cutter 7. The control unit 19 is connected to a drive circuit 20 for the feed motor 5, a drive circuit 21 for the winding shaft motor 13, a drive circuit 22 for the axial drive motor 14, and a drive circuit 23 for the pneumatic or hydraulic cylinder 8 of cutter 7. Also connected to the control unit 19 are a keyboard 24 for entering data indicative of the amounts by which the feed motor 5, winding shaft motor 13 and motor 14 are to be driven, a CRT 25 for displaying the contents of, e.g., a program described hereinbelow, an external memory device 26 such as a floppy disc for storing programs and data, a digital switch 27 for designating the rotating speed of the feed motor 5, and a digital switch 28 for designating the rotating speed of the winding shaft motor 13. The speeds of motors 5, 13 are decided in accordance with the values set by the digital switches 27, 28, respectively.

The control unit 19 includes a memory 29 for storing the input data from the keyboard 24 and data received from the external memory device 26, a microprocessor (CPU) 190, and a ROM 191. Ideal as the CPU 190 is Model Z80A. The ROM 191 stores the control program of the CPU 190 as well as other data. The memory 29 is a RAM area also used as the working area of the CPU 190 and stores a program, illustrated in FIG. 6 and described below, input from the keyboard 24 or external memory device 26. The CPU 190 decodes the program in memory 29 in accordance with the control program in ROM 191 and, as necessary, actuates the motor drive circuits and pneumatic or hydraulic cylinder 8 to operate the overall apparatus.

Figures 7, 8:
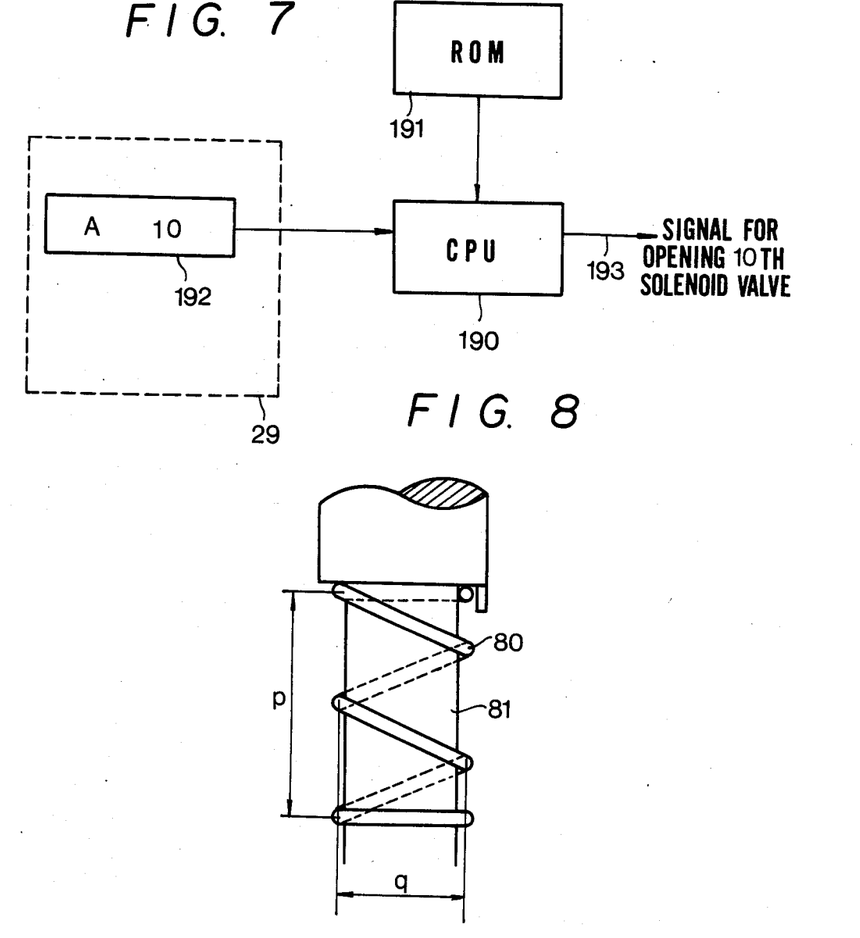
FIG. 7 is a block diagram illustrating operation code interpretation performed by the system of FIG. 3.
FIG. 8 is a side view illustrating one example of the shape of a coil spring wound on a mandrel.

As shown in FIG. 7, the control system of FIG. 3 is so adapted that the CPU 190 reads out an operation code 192 (A 10) stored in the memory 29, decodes the operation code 192 in accordance with the control program stored in ROM 191, and produces an output signal 193 for opening a tenth solenoid valve. As disclosed in the specification of U.S. Pat. No. 4,289,004, solenoid valves are provided for actuating peripherally arranged tools such as the cutter and the winding tool that forms the coil spring. Since the actual spring manufacturing process follows that set forth in the abovementioned U.S. patent, only the tenth solenoid valve is mentioned here by way of example.

In the apparatus of the present invention, the numbers revolutions of the feed motor 5 and winding shaft motor 13 are controlled by the control unit 19, whereby exact agreement is established between the amount of wire 1 fed by the feed rollers 2a, 2b and the amount of wire 1 wound into a coil by the mandrel 9b of winding tool 9. As a result, the length of the wire 1 between the pair of feed rollers 2a, 2b and the winding tool 9 is constant at all times and the wire is not tensioned by the feed rollers 2a, 2b. Consequently, winding angle error caused by such factors as wire rigidity and the formation of coil spring legs of non-uniform length resulting from slippage between the projection 11 and the wire 1 are prevented from occurring. Furthermore, since the arrangement is such that the wire 1 is not pulled out from the feed rollers 2a, 2b by friction offered by the projection 11, no instability ascribable to the degree of this friction is produced in the formed coil spring. The foregoing features of the present invention make it possible to form coil springs having a very high degree of precision.

Figure 5:
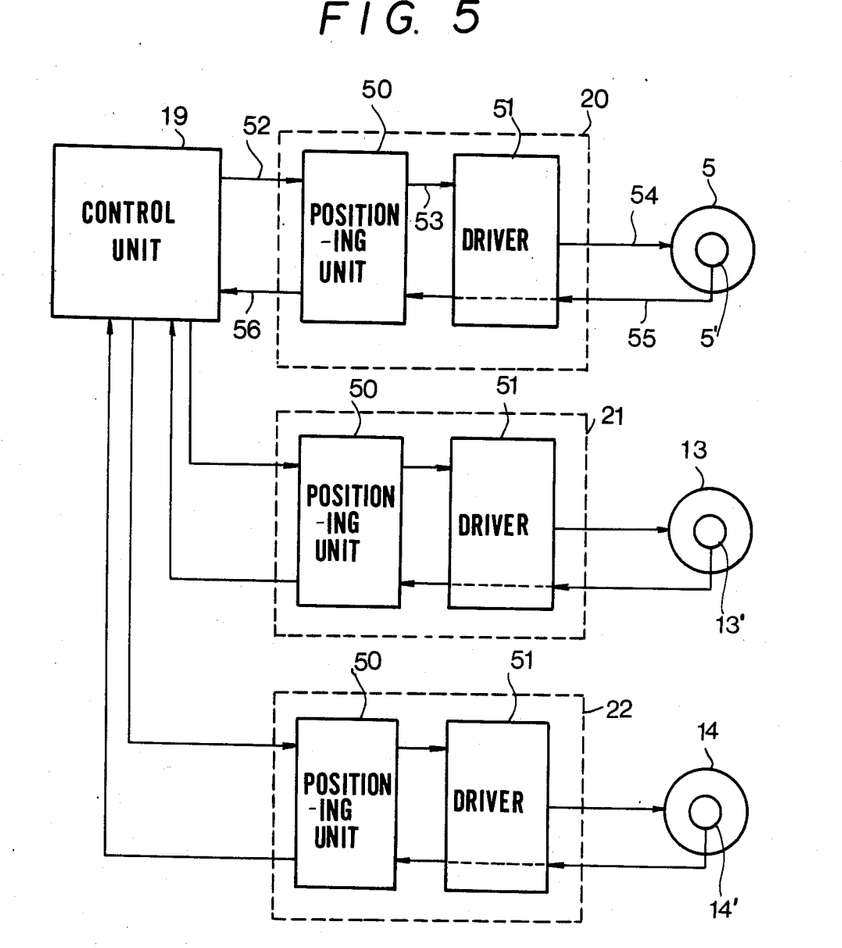
FIG. 5 is a block diagram for describing motor drive.

The various motors are driven through an arrangement illustrated in the block diagram of FIG. 5. As mentioned above, the feed motor 5, winding shaft motor 13 and axial drive motor 14 each comprise a servomotor. The respective drive circuits 20, 21, 22 of these motors are of identical construction and operate in the same manner. Let us now describe the construction and operation solely of the drive circuit 20 for the feed motor 5 by way of example.

The drive circuit 20 comprises a positioning unit 50 and a driver 51. In accordance with preset values of rotating speed and amount of rotation of feed motor 5, the control unit 19 produces a rotational signal 52 which is applied to the positioning unit 50. The rotation signal 52 is a train of pulses each one of which causes the feed motor 5 to rotate through a minimum angle of rotation. Accordingly, the number of pulses constituting the signal 52 corresponds to the amount of feed motor rotation, and the period of the pulses corresponds to the rotating speed of the feed motor 5. The positioning unit 50 produces an analog voltage signal 53 the magnitude whereof is based on the pulsed rotation signal 52. The analog voltage (V) ranges between $-10$ V and $+10$ V (i.e., $-10$ V $\leq$ V $\leq 10$ V). The driver 51 responds to the signal 53 by generating a motor drive signal 54 (about 250 V) to drive the feed motor 5 into rotation.

The feed motor 5 has a resolver 5' that produces a pulsed signal 55 due to rotation of the feed motor. The signal 55 is applied to the driver 51 and positioning unit 50 which, on the basis of the number of pulses in pulse signal 55 and the pulse rate thereof, check the number of revolutions and the rotating speed of the feed motor 5, correct the rotating speed and, if an abnormality develops, inform the control unit 19 of the fact by means of a signal line 56.

As mentioned above, the drive circuit 21 and drive circuit 22 operate in the same manner as the above drive circuit 20 to rotate their respective motors 13, 14. Note that the motors 13, 14 also possess resolvers 13', 14', respectively.

Let us now discuss the basic instructions in the program of the present apparatus for controlling motor drive and the peripheral equipment. Preparing a program by using these instructions will make it possible to manufacture coils springs of any desired shape. Though the details will not be described here, various instructions other than these basic instructions, such as loop instructions, jump instructions, conditional decision instructions and speed control instructions are also prepared.

Figure 6:
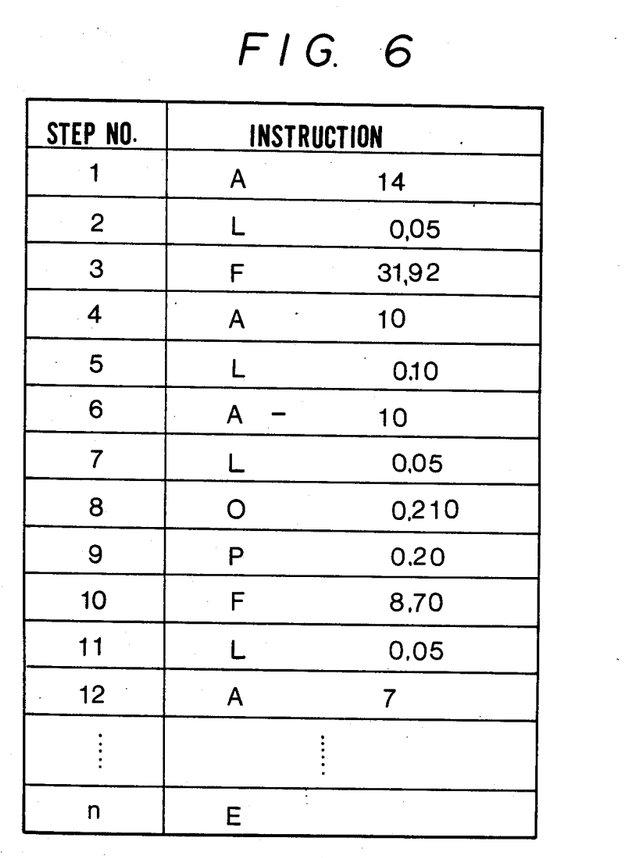
FIG. 6 is a diagram illustrating an example of a program.

(1) feed instruction (F): designates amount of wire feed
(2) rotation instruction (O): designates amount of winding shaft rotation
(3) pitch instruction (P): designates axial motion of winding shaft
(4) check instruction (C): checks wire status, shape of coil spring, etc.
(5) output instruction (A): controls solenoid valves and peripheral equipment
(6) timer instruction (L): determines waiting time
(7) end instruction (E): indicates end of program FIG. 6 illustrates an example of a program created by using the above instructions. The various operations will now be described in the order of the program steps:
Step 1: Open solenoid valve 14
Step 2: Wait 0.05 sec
Step 3: Feed wire 31.93 mm
Step 4: Open solenoid valve 10
Step 5: Wait 0.10 sec
Step 6: Close solenoid valve 10
Step 7: Wait 0.05 sec
Step 8: Rotate winding shaft 0.21 revolutions (75.6°) in forward direction (minimum angular increment: 360°×1/1000)
Step 9: Move winding shaft upward 0.2 mm
Step 10: Feed wire 8.7 mm in forward direction
Step 11: Wait 0.05 sec
Step 12: Open solenoid valve 7
Step n: End of program The winding shaft motor 13, axial drive motor 14 and feed motor 5 start rotating simultaneously in accordance with the settings of steps 8 through 10. The solenoid valves actuate such components as the pneumatic or hydraulic cylinder 8. Creating the above program in accordance with such factors as wire diameter and coil spring shape makes it possible to manufacture springs of any shape to accommodate the type of wire.

Moreover, if such programs are stored in the memory 29 or on a floppy disc of the external memory device 26 in advance, springs of exactly the same shape can be manufactured, providing the same type of wire is used, merely by loading the programs.

FIG. 8 shows a wire 80 wound around a mandrel 81. The amount of axial travel of the mandrel 81 is represented by P and the central diameter of the spring is denoted by q. The developed length l of the spring wound around the mandrel 81 is given by the following equation:

$$l = \sqrt{P^2 + (q\pi T)}$$

where T represents the number of turns and $\pi$ represents pi. If the amount of axial travel, number of turns and central diameter are given, the amount of wire to be fed during rotation of the winding tool can be obtained by performing the above calculation.

ADVANTAGES OF THE INVENTION

According to the coil spring manufacturing apparatus of the present invention, the amount of wire fed and the amount of wire wound around the mandrel can be brought into accurate agreement, thus making it possible to form highly precise coil springs whose winding angle and leg length are constant from one coil spring to another. In addition, spring pitch can be changed at will by independently controlling the axial drive motor 14 that moves the winding tool 9 in the axial direction. Since the amount each motor is rotated and the operating sequence of the motors can be freely set, high-precision coil springs of any desired shape can be obtained irrespective of wire diameter.

According to the coil spring manufacturing apparatus of the present invention, the rotating speeds of the winding motor 13 and feed rollers 2a, 2b can be set independently, thereby making it possible to set coil spring manufacturing conditions in line with, e.g., the type of wire material. Moreover, the coil spring manufacturing apparatus of the present invention is capable of automatically calculating and controlling the amount of wire supplied on the basis of information indicative of spring central diameter, number of turns and amount of axial movement of the winding tool 9. The result is simpler operability.

Furthermore, by providing the coil spring manufacturing apparatus of the present invention with the external memory device 26 storing the control program, coil springs of the desired type can be simply manufactured merely by reading in from the external memory device 26 a program corresponding to the desired spring shape.

As many apparently widely different embodiments of the present invention can be made without departing from the spirit and scope thereof, it is to be understood that the invention is not limited to the specific embodiments thereof except as defined in the appended claims.

What is claimed is:

1. A coil spring manufacturing apparatus comprising:
   winding means being rotatable and axially movable for winding a wire therearound;
   a winding motor for rotating said winding means;
   an axial drive motor for moving said winding means axially while said wire is being wound therearound;
   feed roller means for feeding a wire to said winding means;
   a rotating motor for rotating the feed roller means to feed the wire to said winding means; and
   control means for simultaneously driving said winding motor, said axial drive motor and said rotating motor for regulating the amount of wire being fed per unit time by the feed roller means so that such amount of wire is substantially the same as the amount of wire being wound per unit time around the winding means by said winding motor and said axial drive motor.

2. The apparatus according to claim 1, wherein said control means regulates the axial drive motor for moving said winding means axially by an amount dependent upon a selected spring pitch.

3. The apparatus according to claim 1, further comprising designating means operatively associated with said control means for designating rotating speeds of said winding motor and feed roller rotating motor.

4. The apparatus according to claim 1, wherein said control means simultaneously drives said motors responsive to information indicative of the number of revolutions of said axial drive motor, said winding motor and said rotating motor.

5. The apparatus according to claim 4, further comprising designating means for designating rotating speeds of said winding motor and feed roller rotating motor.

6. The apparatus according to claim 1, wherein said control means includes feed amount determining means for determining an amount of feed of said wire based on information indicative of an amount of axial movement and an amount of rotation of said winding means, and information indicative of spring central diameter.

7. The apparatus according to claim 1, wherein said control means includes external memory means for storing said control information and a control unit coupled to said memory means for providing said regulation based on said control information stored in said external memory means.

* * * * *